Aug. 11, 1936.  J. D. LONG  2,050,758
MEAT GRINDER ATTACHMENT
Filed March 15, 1935
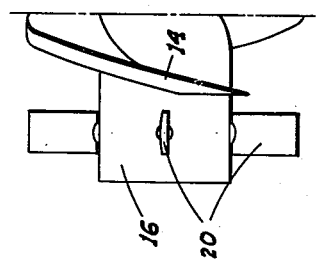
INVENTOR
J. D. Long
BY
ATTORNEY

UNITED STATES PATENT OFFICE 2,050,758

MEAT GRINDER ATTACHMENT

John D. Long, Willows, Calif., assignor of one-fourth to Merritt F. Schneider, one-fourth to Dan W. Dooley, and one-fourth to George A. Rummel, all of Willows, Calif.

Application March 15, 1935, Serial No. 11,257

1 Claim. (Cl. 146—187)

This invention relates to meat grinders of that character which are used in butcher shops for grinding meat to prepare sausage meat, hamburger and the like; the invention being directed particularly to a meat grinding and mixing attachment for such grinders.

In the preparation of ground meats, it is not only essential that the meat be ground very fine, but it is also imperative that a thorough mix be obtained of the lean meat and fats. If such proper mixture is not obtained and the fats remain separate, the hamburger or other ground meat is not only less saleable, but it has a tendency to separate when cooked.

In order to thoroughly mix the ground meats, butchers often grind the lean meat and fats; mix the ground mass by hand and then regrind the mass. This process however requires a great deal of time and is therefore objectionable.

I am also aware that certain attachments for meat grinders have heretofore been disclosed which have for their purpose the double grinding of the meat. Such attachments do not however make any provision for a thorough and complete mixing of the mass of ground meat between the initial grinding and the final grinding.

It is therefore my purpose to provide a meat grinder attachment which will not only provide a double grinding of the meat with one operation, but which will also thoroughly mix the mass of ground lean meat and fat during the single operation and before the second and final grinding takes place.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a side outline of a standard meat grinder with my improved grinding and mixing attachment applied thereto, the same being illustrated in section.

Figure 2 is an enlarged fragmentary elevation illustrating a modified type of agitating paddle mounted on the elongated hub of the forward spiral auger cutter.

Referring now more particularly to the characters of reference on the drawing, the numeral 1 denotes the intake hopper of a standard meat grinder, which communicates with the horizontal barrel 2 in which is mounted the usual spiral auger cutter 3. A disc 4 having relatively large holes 5 therethrough is removably seated in the outer end of the barrel, this disc forming the bearing for the corresponding end of the cutter shaft 6 which projects through the disc. The outer end of the barrel is threaded as at 7 to be ordinarily engaged by a sleeve nut (which I remove) and which usually serves to hold the disc in place.

The attachment comprises an extension barrel 8 which is threaded on its outer end as at 9 and formed with an enlarged tapped flange 10 on its inner end to engage the barrel threads 7. By means of this tapped flange the extension barrel is rigidly yet removably held in place in connection with the threaded barrel 2. The inner end of the barrel 8 engages the disc 4 and holds the same in place when the extension barrel is secured in place.

Removably fitted in the outer end of the extension barrel is a discharge disc 11 having holes 12 therethrough which are smaller than those in the disc 4. This disc forms the bearing for the adjacent end of the stub shaft 13 of a spiral auger cutter 14, which is of the same general design as the cutter 3, the extension barrel having longitudinal cutting ridges 15 therein to co-operate with the cutter 14 as usual.

The shaft 13 projects from the outer end of the hub 16 of the cutter, which hub as usual is continuous along the cutter.

The inner end of the hub 16 of the cutter 14 is formed with a relatively shallow bore into which the outer end of the shaft 6 projects; a cross pin 17 on the shaft 6 engaging in an internal slot 18 in the hub bore so that the two shafts may be connected in driving relation.

The spiral cutter 14 has its inception a relatively great distance along the hub 16 from the outer face of the disc 4; the hub 16 of the spiral cutter extending inwardly to a point immediately adjacent the disc 4. This construction forms in effect a mixing chamber C between the outer face of the disc 4 and the adjacent end of the spiral cutting blade.

Spaced about the hub 16 and projecting radially therefrom into the chamber C are agitating paddles 19. These paddles are threaded into the hub in order that they may be removed and replaced. The outer face of each paddle tapers inwardly in the direction of rotation of the hub in order to drive the mass of ground meat forward into the spiral cutter 14.

Figure 2 illustrates a modified type of agitating paddle 20, the paddles being mounted with their faces flat in the direction of rotation. This type of blade will be used in heavy duty grinders.

The disc 11 is removably clamped in place in the barrel extension by a sleeve nut 21 which may be the same one originally used to hold the disc 4 in place in the barrel 2.

Cutters 22 and 23 having radial cutting blades are removably mounted on the shafts 6 and 13 respectively and are adapted to move against the inner faces of the discs 4 and 11 respectively. These cutters are common in standard meat grinders.

In operation the lean meat and fats after being subjected to the initial grinding in the barrel 2 are extruded through the holes 5 in the disc into the mixing chamber C in the adjacent end of the extension barrel 8. When they are forced into the chamber C such mass is subjected to a complete and effective mixing action due to the fact that the entire mass will be picked up and carried about with the hub as the same rotates. This rapidly revolving mass of ground meat therefore forms in effect a mixing means for the flow of ground meat being continuously extruded through the disc 4. Of course the revolving mass about the hub is continually feeding into the spiral cutter blade 14 to be further ground and then extruded through the smaller holes 12 in the disc 11.

To further increase the agitation of the mass in the mixing chamber the paddles 19 are provided. These paddles not only mix the mass (which tends to rotate at a slightly slower speed than the hub) but due to their tapered faces, they force the mass into the spiral cutter blade 14. This greatly reduces the strain and load on the entire grinder structure.

The modified paddles shown in Figure 2 are used only on heavy duty machines and therefore need only agitate and mix the mass and do not need the feature of the tapered faces.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A meat grinder unit including a barrel, perforated discs at the opposite ends of the barrel, means to initially grind meat and force the same into the barrel through one disc, an auger cutter in the barrel feeding toward the other disc and having its inception a sufficient distance from said one disc to provide an unobstructed mixing chamber between said one disc and the adjacent end of the cutter, and non-cutting agitator paddles fixed with the cutter and extending radially of the axis thereof into the mixing chamber and arranged to advance the meat coming in contact therewith into the zone of influence of the cutter.

JOHN D. LONG.